United States Patent
Shinta et al.

(10) Patent No.: US 7,130,125 B2
(45) Date of Patent: Oct. 31, 2006

(54) OPTICAL FILTER AND OPTICAL DEVICE

(75) Inventors: Yoshiki Shinta, Tokyo (JP); Yorio Wada, Hanno (JP)

(73) Assignee: Olympus Corporation, Tokyo (JP)

( * ) Notice: Subject to any disclaimer, the term of this patent is extended or adjusted under 35 U.S.C. 154(b) by 194 days.

(21) Appl. No.: 10/960,499

(22) Filed: Oct. 8, 2004

(65) Prior Publication Data

US 2005/0111103 A1    May 26, 2005

(30) Foreign Application Priority Data

Oct. 14, 2003    (JP)    ............ P 2003-354027

(51) Int. Cl.
   *G02B 6/00*    (2006.01)
   *G02B 1/10*    (2006.01)
(52) U.S. Cl. .................. 359/586; 359/588; 359/589; 359/580
(58) Field of Classification Search ................ 359/586, 359/587, 588, 589, 590, 580
   See application file for complete search history.

(56) References Cited

U.S. PATENT DOCUMENTS

| 4,309,075 A | 1/1982 | Apfel et al. | |
|---|---|---|---|
| 4,756,602 A | 7/1988 | Southwell et al. | |
| 5,907,427 A * | 5/1999 | Scalora et al. | 359/248 |
| 6,115,180 A * | 9/2000 | Hirai et al. | 359/586 |
| 6,611,378 B1 | 8/2003 | Wang et al. | |
| 2005/0041293 A1* | 2/2005 | Wada et al. | 359/586 |
| 2006/0007548 A1* | 1/2006 | Watanabe | 359/589 |

FOREIGN PATENT DOCUMENTS

| EP | 0967496 A2 | 12/1999 |
|---|---|---|
| JP | 10-174652 | 6/1998 |
| JP | 3290629 | 3/2002 |

OTHER PUBLICATIONS

Using apodization functions to reduce sidelobes in rugate filters; William H. Southwell; Dec. 1, 1989; vol. 28, No. 23; Applied Optics; pp. 5091-5094.
Letter to Shiga International Patent Office from Kuhnen & Wacker, dated Feb. 25, 2005 and dated stamped received from Shiga Int'l Patent Office Apr. 3, 2005.
Office Action (2 pages) issued on Dec. 16, 2005 in Counterpart Chinese Patent Application w/English language translation (4 pages).

* cited by examiner

*Primary Examiner*—Fayez G. Assaf
(74) *Attorney, Agent, or Firm*—Kenyon & Kenyon LLP

(57) ABSTRACT

This optical filter provides a substrate and thin films. The thin films comprise an outermost layer portion and a refractive index varying portion. The refractive index varying portion is formed by laminating alternately towards the substrate a low refractive index layer having a refractive index that is higher than that of air and a high refractive index layer having a refractive index that is higher than the low refractive index layer. The outermost layer portion comprises an outermost low refractive index layer having a refractive index that is higher than that of air, a first outermost high refractive index layer having a refractive index that is higher than that of the outermost low refractive index layer, and a second outermost high refractive index layer having a refractive index that is higher than that of the first outermost high refractive index layer.

8 Claims, 15 Drawing Sheets

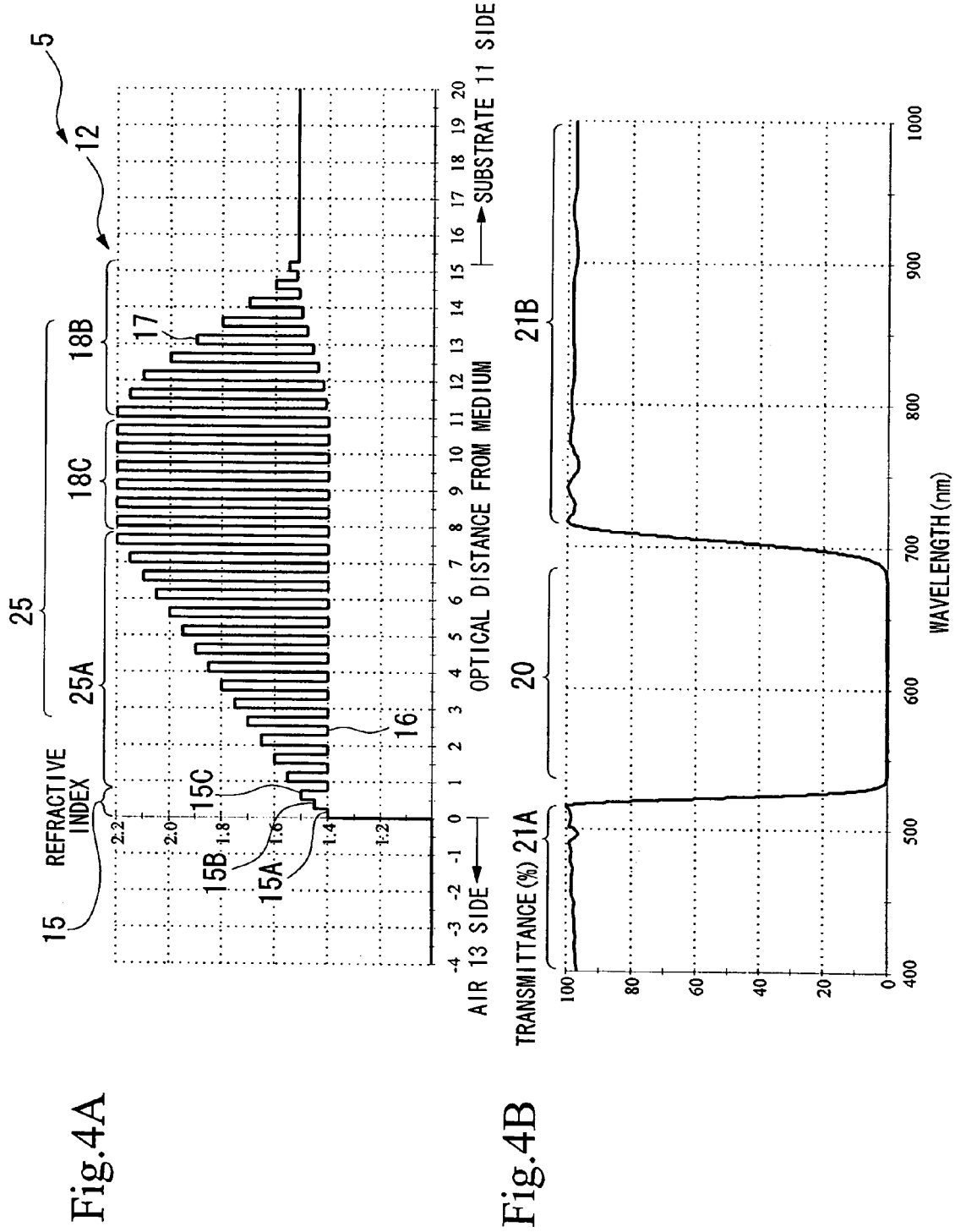

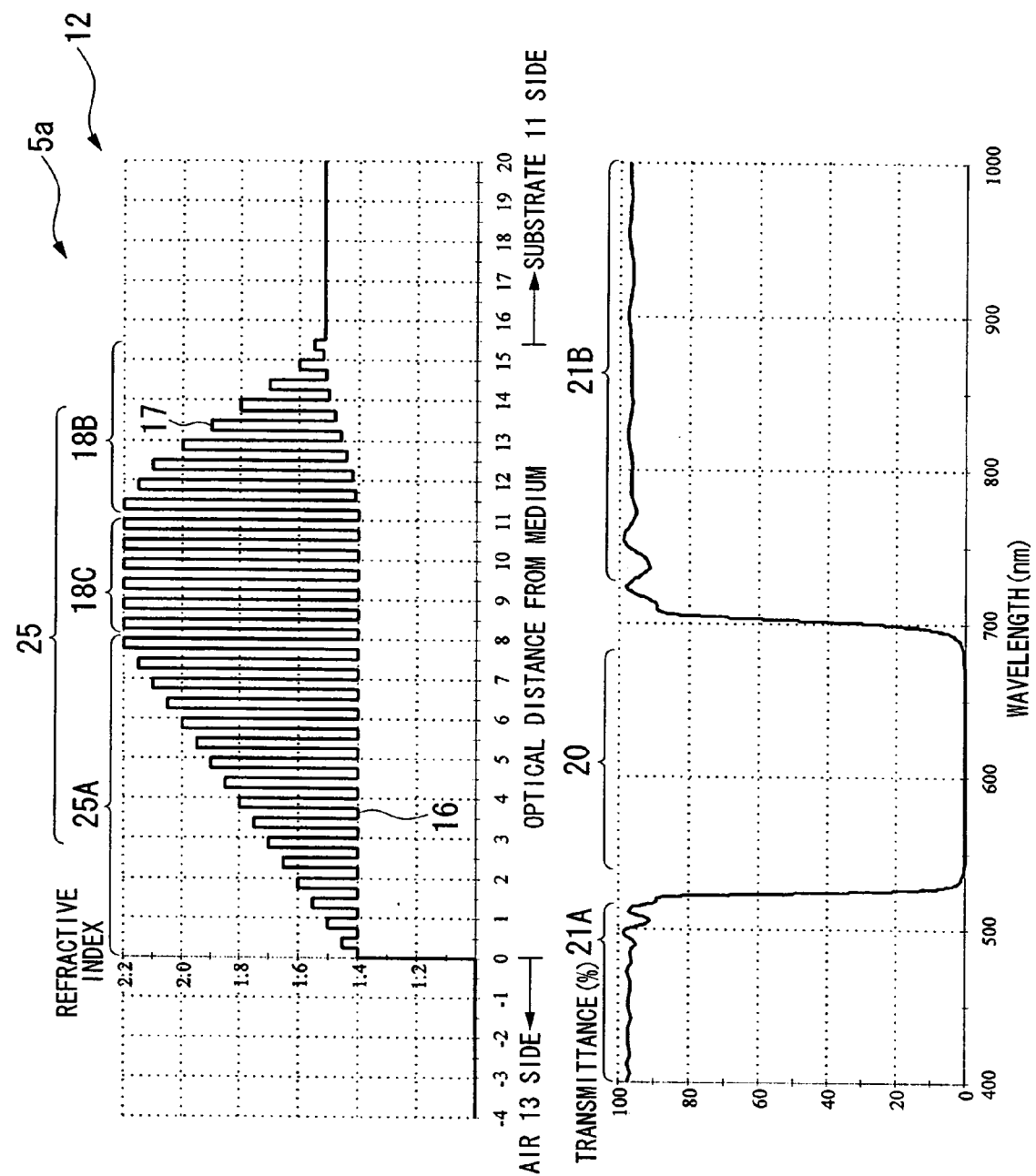

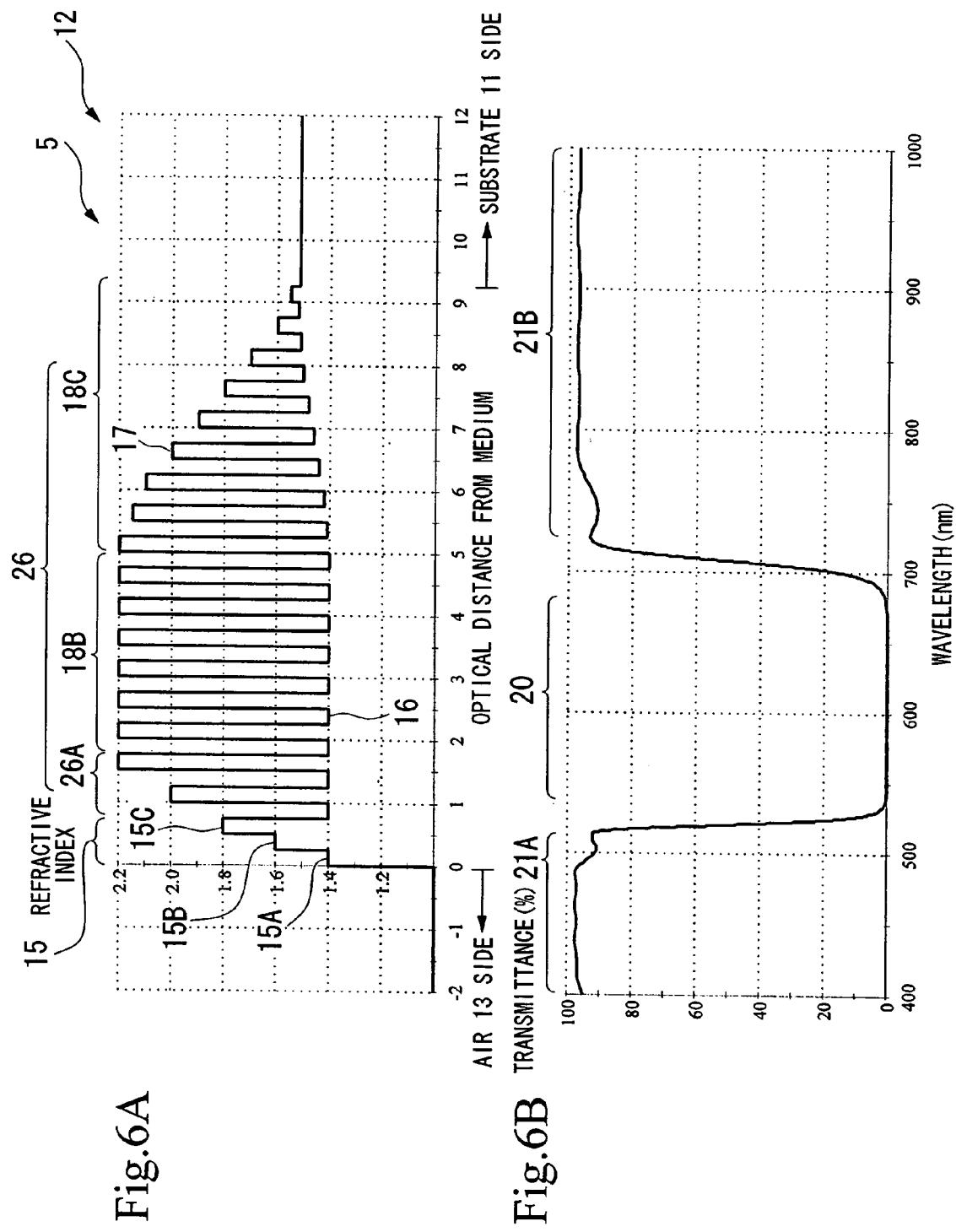

OPTICAL FILTER AND OPTICAL DEVICE

BACKGROUND OF THE INVENTION

1. Field of the Invention

The present invention relates to an optical filter and an optical device. Priority is claimed on Japanese Patent Application No. 2003-354027, filed Oct. 14, 2003, the content of which is incorporated herein by reference.

2. Description of Related Art

A fluorescent microscope is an example of an optical device that is used in the observation of living biological specimens. The fluorescent microscope is a device that irradiates with excitation light a specimen such as cells that have undergone a staining treatment, and observes the fluorescent light emitted by the specimen at that time. By carrying out observation using this type of device, it is possible to analyze the structure and properties of the specimen.

In the recent analysis of the genome, for example, it is necessary to irradiate excitation light having a wavelength of 502 nm and observe fluorescent light having a peak at 526 nm. In this case, because the wavelengths of the excitation light and the fluorescent light are close to each other, it is necessary to reliably separate both wavelengths and detect the fluorescent light with a high efficiency. In order to attain this, it is necessary to eliminate the excitation light in the rejection band and transmit the fluorescent light having the wavelength to be observed in the transmission bands. An optical filter having such properties is used as a crucial part that determines the sensitivity and precision of the fluorescent light measurement.

In this optical filter, there is a steep rise in the spectral characteristics at the boundary between the transmission bands and the rejection band, and in the transmission bands, a capacity to transmit substantially 100% of the light is required.

Such an optical filter that blocks light of a predetermined wavelength band and transmits the other wavelengths is called a minus filter. This optical filter (minus filter) is manufactured as a multi-layer film, in which a layer having a high refractive index and a layer having a low refractive index are alternately stacked on a substrate.

In an optical filter whose refractive indices of the films in the direction of the film thickness are periodically and continuously varied is called a rugate filter. Here, when the refractive index distribution is in a form called a wavelet, it is possible in principle to eliminate periodic variation in the transmissivity (ripple) in the transmission bands (for example, W. H. Southwell, "Using Apodization Function to Reduce Sidelobes in Rugate Filters", Appl. Opt., 1989, Vol. 28). In addition, accompanying this, as the number of layers described above is increased, the rise at the boundary between the transmission bands and the rejection band can be made more steep. The use of this principle is shown in FIG. 14A.

However, it is extremely difficult to vary continuously the refractive indices of the films during actual film formation. Thus, various proposals have been made in which the continuous refractive index distribution is partitioned stepwise and varied by approximation (for example, Japanese Patent No. 3290629, FIG. 1). The use of this principle is shown in FIG. 15A.

SUMMARY OF THE INVENTION

The optical filter of the present invention including a substrate and thin films formed on the substrate, wherein:

the thin films include an outermost layer portion and a refractive index varying portion;

the outermost layer portion contacts an optical medium whose refractive index is lower than the refractive index of the substrate, and includes an outermost low refractive index layer, a first outermost high refractive index layer, and a second outermost high refractive index layer;

the outermost low refractive index layer is provided at a position in contact with the optical medium and has a refractive index that is higher than the refractive index of the optical medium;

the first outermost high refractive index layer is provided at a position in contact with the outermost low refractive index layer and has a refractive index that is higher than the refractive index of the outermost low refractive index layer;

the second outermost high refractive index layer is provided at a position in contact with the first outermost high refractive index layer and has a refractive index that is higher than the refractive index of the first outermost high refractive index layer;

the refractive index varying portion includes low refractive index layers whose refractive index are higher than the refractive index of the optical medium, and high refractive index layers whose refractive index are higher than the refractive index of the low refractive index layer, the low refractive index layer and the high refractive index layer are alternately stacked towards the substrate side;

the refractive index varying portion is divided into a first stacked portion, a second stacked portion, and a third stacked portion;

the low refractive index layer which forms the first stacked portion is provided at a position in contact with the outermost layer portion, the refractive index of the high refractive index layer which is adjacent to the outermost layer portion by interposing between the outermost layer portion and itself among the high refractive index layers which form the first stacked portion, is higher than the refractive index of the second outermost high refractive index layer, the refractive indices of other the high refractive index layers which form the first stacked portion, is as high as the high refractive index layer near the substrate;

the second stacked portion is provided at a position in contact with the substrate side of the first stacked portion, and the refractive indices of the high refractive index layers which form the second stacked portion, is as low as the high refractive index layer near the substrate; and the third stacked portion is provided between the first stacked portion and the second stacked portion, and the refractive index of the high refractive index layer is substantially identical to that of the high refractive index layer which has the highest refractive index among the high refractive index layers which form the first stacked portion.

In the optical filter of the present invention, the refractive index varying portion is provided in plurality, and the refractive index varying portions are stacked towards the substrate side; and when one of the refractive index varying portions serves as a first refractive index varying portion and another one of the refractive index varying portions serves as a second refractive index varying portion, among the following refractive index layers, the film thickness of at least one of the refractive index layers differs from the film thickness of the other refractive index layers:

the high refractive index layer in the first refractive index varying portion;

the low refractive index layer in the first refractive index varying portion;

the high refractive index layer in the second refractive index varying portion;

the low refractive index layer in the second refractive index varying portion.

In the optical filter of the present invention, the refractive index of the low refractive index layer in the first stacked portion and the third stacked portion is substantially identical to the refractive index of the outermost low refractive index layer; and the refractive index of the low refractive index layer in the second stacked portion is as high as the low refractive index layer near the substrate.

The optical devise of the present invention includes the optical filter describe above.

BRIEF DESCRIPTION OF THE DRAWINGS

FIG. 4A is a graph showing the film structure of the absorption filter in another example of the first embodiment of the present invention;

FIG. 4B is a graph showing the spectral characteristics of the same absorption filter.

FIG. 5A is a graph showing the film structure of a conventional absorption filter;

FIG. 5B is a drawing showing the spectral characteristics of the same absorption filter.

FIG. 6A is a graph showing the film structure of the absorption filter in another example of the first embodiment of the present invention;

FIG. 6B is a graph showing the spectral characteristics of the same absorption filter.

DETAILED DESCRIPTION OF THE INVENTION

The first embodiment will be explained with reference to FIG. 1, FIG. 2A, and FIG. 2B.

Figure 1:
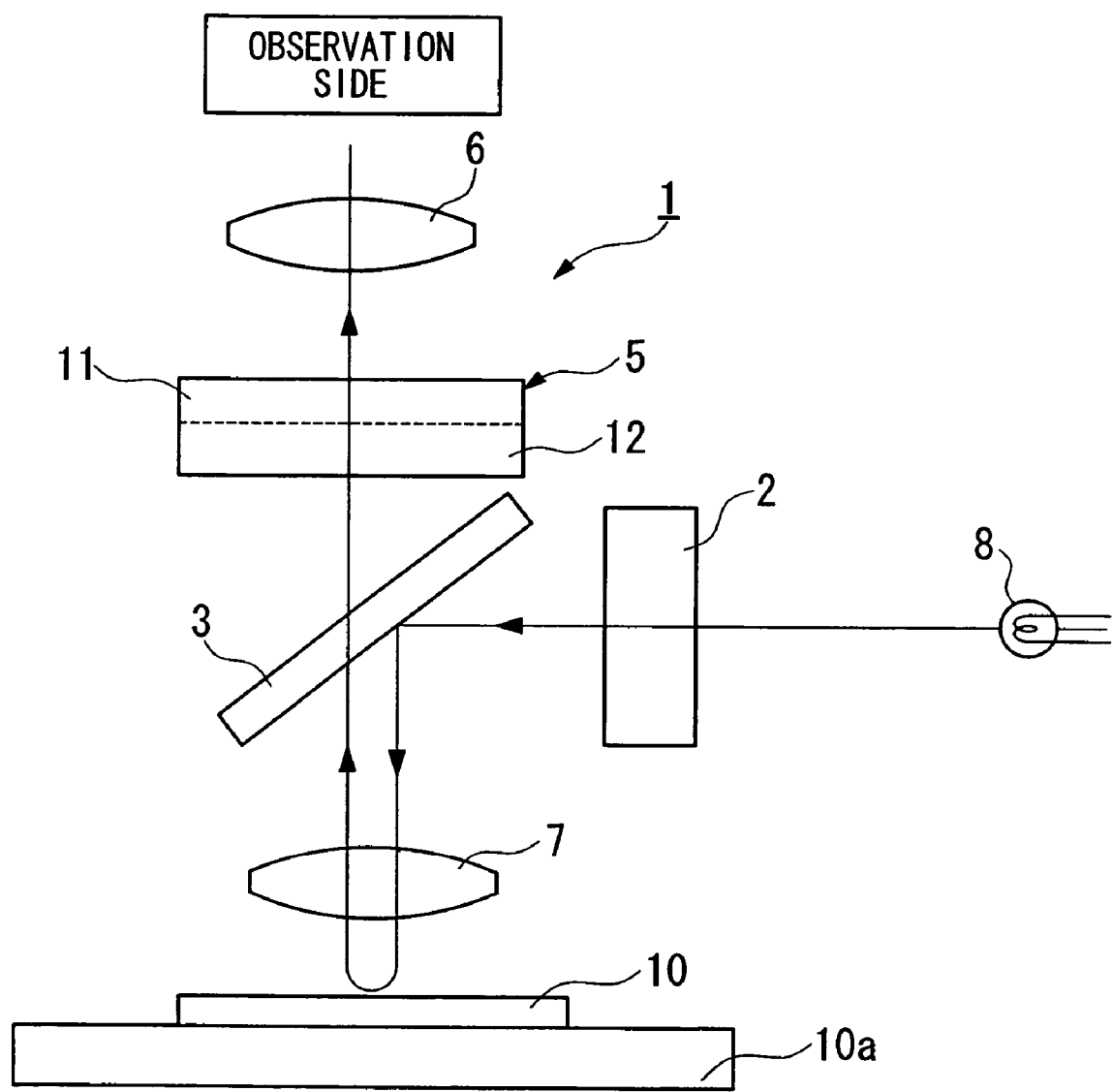
FIG. 1 is a drawing showing the essential elements of the fluorescent light microscope according to the first embodiment of the present invention.

The fluorescent light microscope (optical device) 1 according to the present embodiment shown in FIG. 1 consists of an excitation filter 2, a dichroic mirror 3, an absorption filter (optical filter) 5, an eyepiece lens 6, and an objective lens 7. The specimen 10, of an organism or cell that is the object of observation of the fluorescent light microscope 1, is mounted on the stage 10a.

The excitation filter 2 is mounted on the light path of the light emitted by the light source 8. The excitation filter 2 selects only the component of a particular wavelength among the light emitted from the light source 8 and transmits this light as excitation light.

The dichroic mirror 3 is mounted on the light path of the excitation light that has been transmitted by the excitation filter 2. The dichroic mirror 3 has the characteristic of reflecting at a high efficiency the light including a predetermined wavelength band and transmitting at a high efficiency the other (or separate) wavelength bands. The dichroic mirror 3 also reflects the excitation light that has been transmitted through the excitation filter 2 and irradiate the specimen 10, such as living cells, and transmits to the observation side the fluorescent light emitted from the specimen 10 due to the irradiation by the excitation light. Note that instead of the dichroic mirror 3, a semi-transparent mirror can also be used.

The eyepiece lens 6 and the objective lens 7 are mounted on the light path of the fluorescent light emitted from the specimen 10. The eyepiece lens 6 is mounted between the absorption filter 5 and the observation side, and the objective lens 7 is mounted between the specimen 10 and the dichroic mirror 3.

The absorption filter 5 consists of a glass substrate 11 and thin film 12 formed on this substrate 11. The absorption filter 5 selectively transmits only the fluorescent light emitted from the specimen 10.

Figures 2A, 2B:
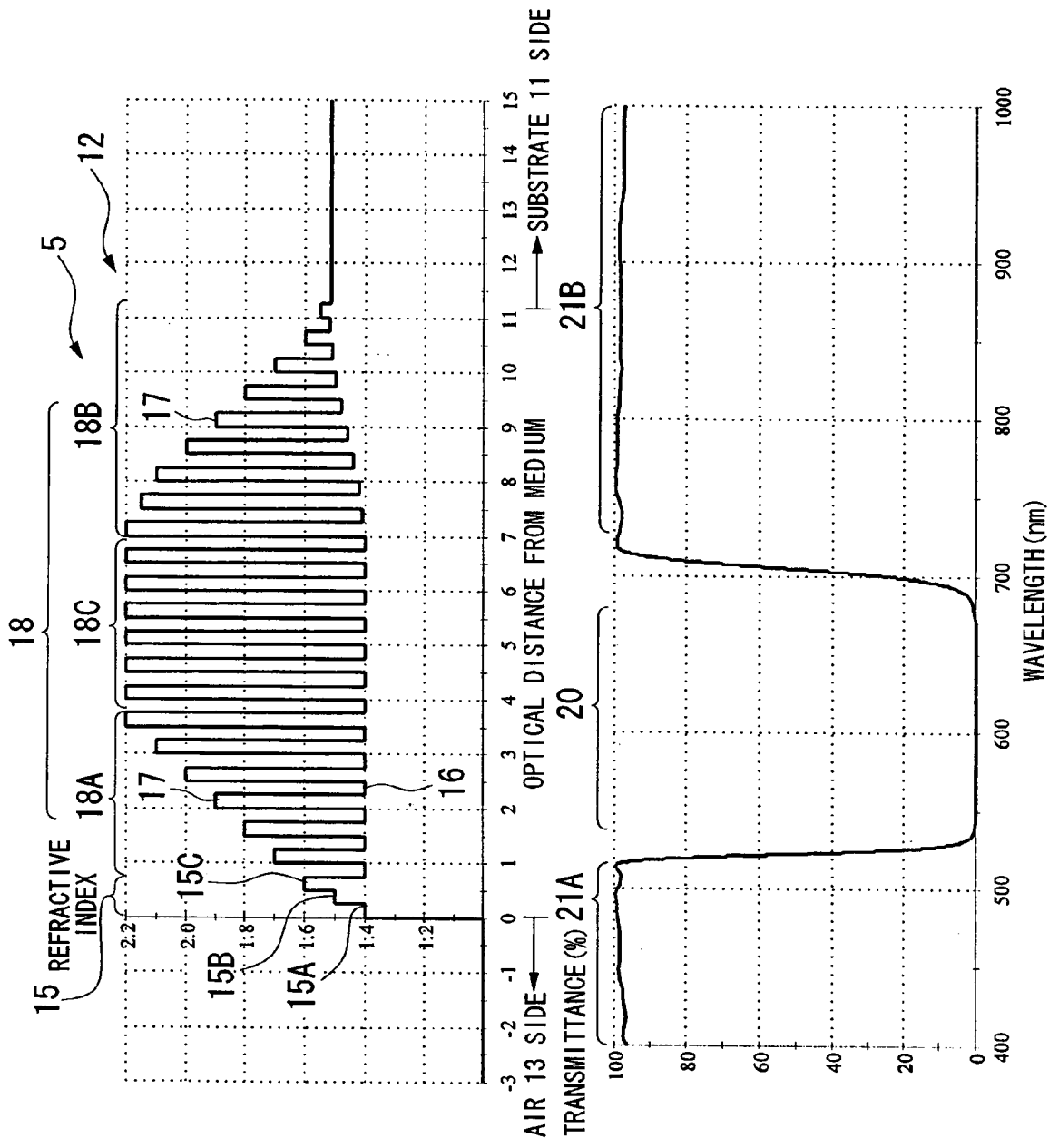
FIG. 2A is a graph showing the film structure of the absorption filter in the first embodiment of the present invention.
FIG. 2B is a graph showing the spectral characteristics of the same absorption filter.

As shown in FIG. 2A, the thin film 12 consists of an outermost layer portion 15 and a refractive index varying portion 18.

The outermost layer portion 15 is formed so as to be in contact with the air (optical medium), which has a refractive index that is lower than that of the substrate 11. The outermost layer portion 15 consists of an outermost low refractive index layer 15A, a first outermost high refractive index layer 15B, and a second outermost high refractive index layer 15C.

The outermost low refractive index layer 15A forms the outermost layer portion so as to be in contact with the air 13. The refractive index of the outermost low refractive index layer 15A is set higher than the refractive index of the air 13 and equal to or less than the refractive index of the substrate 11. The first outermost high refractive index layer 15B is stacked on the substrate 11 adjacent to the outermost low refractive index layer 15A. The refractive index of the first outermost high refractive index layer 15B is set higher than the refractive index of the outermost low refractive index layer 15A. The second outermost high refractive index layer 15C is stacked on the substrate 11 adjacent to the first outermost high refractive index layer 15B. The refractive index of the second outermost high refractive index layer 15C is set higher than the refractive index of the first outermost high refractive index layer 15B.

The refractive index varying portion 18 consists of a low refractive index layers 16 and a high refractive index layers 17. The refractive index varying portion 18 is formed such that the low refractive index layers 16 and the high refractive index layers 17 are stacked alternately towards the substrate 11 side.

The refractive index of the low refractive index layer 16 is set higher than the refractive index of the air 13 and equal to or less than the refractive index of the substrate 11. The refractive index of the high refractive index layer 17 is set higher than the refractive index of the low refractive index layer 16.

The refractive index varying portion 18 is divided into the first stacked portion 18A, the second stacked portion 18B, and the third stacked portion 18C The first stacked portion 18A is formed in contact with the outermost layer portion 15. In the first stacked layer 18A, the low refractive index layers 16 and the high refractive index layers 17 described above are stacked alternately. On the portion of the first stacked portion 18A that is most distant from the substrate 11, the low refractive index layer 16 is stacked adjacent to the substrate 11 side of the outermost layer portion 15, the high refractive index layers 17 and the low refractive index layers 16 are stacked alternately so as to be adjacent to this low refractive index layer 16.

In the first stacked portion 18A, the refractive index of the high refractive index layer 17 is set higher than that of the second outermost high refractive index layer 15C. Furthermore, the refractive indices of the high refractive index layers 17 are set so as to become gradually higher towards the substrate 11 side. That is, the refractive indices of the high refractive index layers 17, which are arranged so as to be interposed between low refractive index layers 16, become higher as they become nearer to the substrate 11.

The second stacked portion 18B is formed closer to the substrate 11 side than the first stacked portion 18A. In the second stacked portion 18B, the refractive indices of the high refractive index layers 17 are set so as to become gradually lower towards the substrate 11 side. That is, the refractive indices of the high refractive index layers 17, which are arranged so as to be interposed between low refractive index layers 16, become lower as they become nearer to the substrate 11.

The third stacked portion 18C is formed between the first stacked portion 18A and the second stacked portion 18B. In the third stacked portion 18C, the refractive index of the high refractive index layer 17 is substantially identical to the highest refractive index among the high refractive index layers 17 that form the first stacked portion 18A.

In the first stacked portion 18A and the third stacked portion 18C, the refractive index of the low refractive index layers 16 is substantially identical to the refractive index of the outermost low refractive index layer 15A. In addition, in the second stacked portion 18B, the refractive indices of the low refractive index layers 16 are set to become gradually higher towards the substrate 11 side and reach the refractive index of the substrate 11. That is, the refractive indices of the low refractive index layers 16, which are arranged so as to be interposed between high refractive index layers 17, become higher as they become nearer to the substrate 11, and the refractive index of the low refractive index layer 16 closest to the substrate 11 is substantially identical to the refractive index of the substrate 11.

Generally, a magnesium fluoride is used in the material for the low refractive index layers 16, and generally a tantalum oxide is used in the material for the high refractive index layers 17.

In the present embodiment, the refractive index of the substrate 11 is 1.52. In addition, the refractive index of the outermost low refractive index layer 15A that forms the outermost layer portion 15 is 1.4; the refractive index of the first outermost high refractive index layer 15B is 1.5; and the refractive index of the second outermost high refractive index layer 15C is 1.6. The refractive indices of the high refractive index layers 17 that form the first stacked portion 18A are set stepwise within a range from 1.7 to 2.2. The refractive indices of the high refractive index layers 17 that form the second stacked portion 18B are set stepwise within a range exceeding 1.52 up to 2.2. The refractive index of the low refractive index layers 16 that form the first stacked portion 18A and the third stacked portion 18C are 1.4. The refractive indices of the low refractive index layers 16 that form the second stacked portion 18B are set stepwise within a range from 1.4 to less than 1.52.

The thin film 12 is formed by a film having 45 layers. That is, there are a total of 45 layers from the substrate 11 side to the outermost low refractive index layer 15A of the outermost layer portion 15. In addition, the design wavelength of the thin film 12 is 600 nm, and the optical film thickness of each layer is 0.25 times this design wavelength.

Here, the results of a simulation of the transmissivity are shown in FIG. 2B. Note that in this simulation, it is assumed that there is no refractive index dispersion in each of the layers.

As shown in FIG. 2B, the absorption filter 5 consists of a rejection band 20, which shows substantially 0% transmissivity, and transmission bands 21A and 21B, which have an extremely high transmissivity. The wavelength positioned at the center of the rejection band 20 is substantially 610 nm, and the bandwidth of the rejection band 20 is about 140 nm. In contrast, the transmission bands 21A and 21B transmit light that excludes the wavelengths included in the rejection band 20.

Next, the method of observing the specimen using the fluorescent light microscope 1 will be explained.

When light is emitted from the light source 8, this light is excited in the step of being transmitted through the excitation filter 2 to become excitation light having a particular wavelength. The light that has been transmitted through the excitation filter 2, that is, the excitation light, is projected onto the dichroic mirror 3.

The excitation light that is projected onto the dichroic mirror 3 is reflected towards the objective lens 7, and irradiated on the specimen 10 after being condensed by the objective lens 7. When the excitation light irradiates the specimen 10, fluorescent light is emitted from therefrom. This fluorescent light reaches the dichroic mirror 3 after becoming parallel light in the step of being transmitted through the objective lens 7. The fluorescent light that has reached the dichroic mirror 3 is transmitted through the dichroic mirror 3, and is incident to the absorption filter 5.

The fluorescent light that is incident to the absorption filter 5 is incident from the outermost low refractive index layer 15A side of the outermost layer portion 15, and after being transmitted in order through the first stacked portion 18A, the third stacked portion 18C, and second stacked portion 18B, it is emitted to the outside from the substrate 11 side.

Excitation light and the like is also incident to the absorption filter 5 because light (referred to below as excitation light and the like) having wavelengths other than those of the fluorescent light is emitted from the specimen 10. However, the thin film 12 has the refractive index varying portion 18 described above, and furthermore the rejection band 20 is set so as to include the wavelengths of the excitation light and the like, and the transmission bands 21A and 21B are set so as to include the fluorescent light wavelengths. Thereby, while the absorption filter 5 prevents the emission of light having a wavelength band that includes the excitation light and the like to the outside, the light having a wavelength band that is included in the fluorescent light is transmitted.

In this manner, only the fluorescent light emitted from the absorption filter 5 is transmitted through and condensed by the eyepiece lens 6 to reach the observation side.

As shown, for example, in FIG. 2B, the transmissivity at the border between the rejection band 20 and the transmission bands 21A and 21B changes steeply due to the absorption filter 5. In addition, the ripple in the transmission bands 21A and 21B is suppressed by the absorption filter 5. Thereby, it is possible to increase the amount of transmitted light in the transmission bands 21A and 21B. In addition, the absorption filter 5 can improve the stability of the spectral characteristics because each layer is formed such that controlling the film thickness during film formation is easy.

Figure 3:
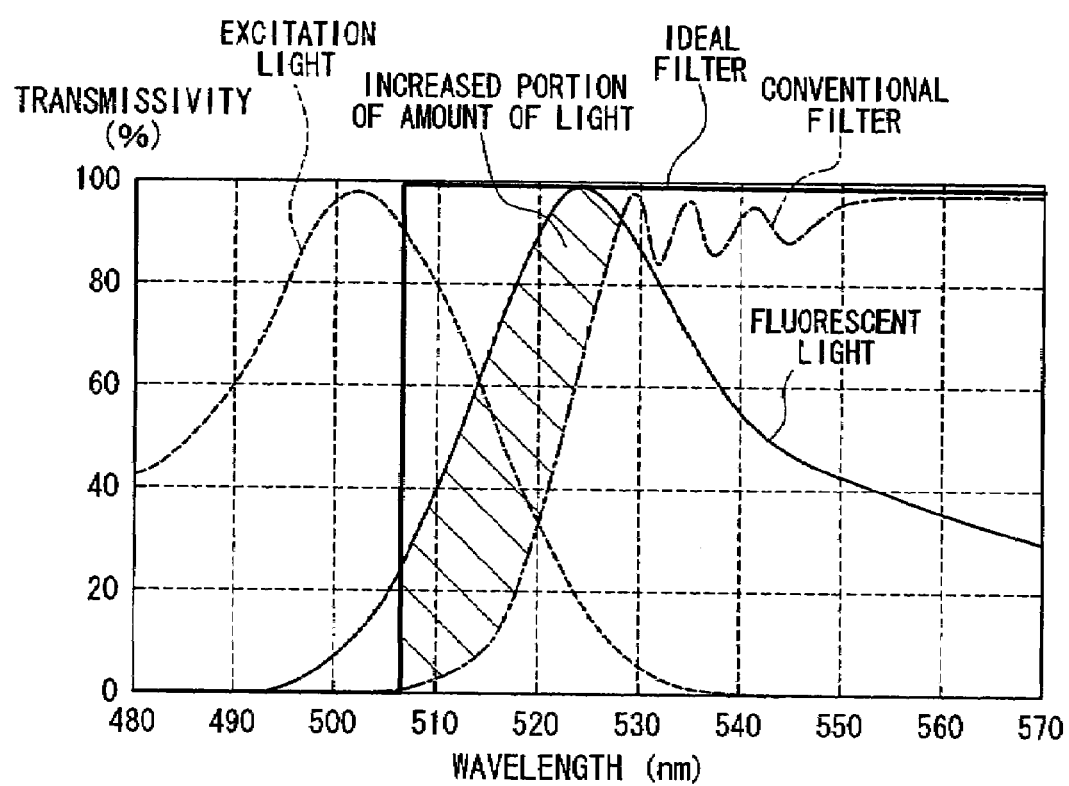
FIG. 3 is a graph showing the relationship between the wavelength and the transmissivity of the fluorescent light microscope of the first embodiment of the present invention.

Furthermore, as shown in FIG. 3, according to the fluorescent light microscope 1, the absorption filter 5 has optical characteristics that are close to those of an ideal filter, and thus the amount of light (the portion of the increase in the amount of light) of the wavelength region, in which the amount of transmitted light decreased in a conventional filter, can also be transmitted without loss. Thereby, it is possible to improve remarkably the detection sensitivity (or the S/N ratio) during fluorescent light measurement, and thereby in genome analysis and the like, it is possible to improve the analytic precision and the detection precision and shorten the observation time.

In addition, the low refractive index layers 16 are stacked such that, as described above, their refractive indices change gradually, and thus the loss in the border between the substrate 11 and the thin film 12 is suppressed, and thereby it is possible to make the amount of transmitted light in the transmission bands 21A and 21B more advantageous.

In the present embodiment, as shown in FIG. 4A, the total number of layers in the first stacked portion 25A that forms the refractive index varying portion 25 can be increased from 12 layers to 28 layers. Thereby, it is possible to make the refractive indices of the high refractive index layers 17 change more smoothly than the refractive index of the first stacked portion 18A. In this manner as well, as shown in FIG. 4B, it is possible to form a rejection band 20 providing a central wavelength and bandwidth having the same spectral characteristics as those shown in FIG. 2B, and thus it is possible to obtain an operation and effect identical to that described above.

Here, in order to compare the absorption filters 5 shown in FIG. 4A and FIG. 4B, the film structure of the absorption filter 5*a*, in which the outermost layer portion 15 is not provided, shown in FIG. 5A, while the spectral characteristics of the absorption filter 5*a* are shown in FIG. 5B. According to the absorption filter of the present embodiment, in comparison to the absorption filter 5*a*, in which the outermost layer portion 15 is not present, it is possible to make the ripple of the fluorescent light in the transmission bands 21A and 21B small, and it is possible to obtain an operation and effect identical to that described above.

In the present embodiment, as shown in FIG. 6A, the total number of layers in the first stacked portion 26A that forms the refractive index varying portion 26 can be decreased from 12 layers to 4 layers. Thereby, it is possible to make the refractive indices of the high refractive index layer 17 change more steeply than the first stacked portion 18A. In this manner, as shown in FIG. 6B, it is possible to obtain an operation and effect identical to that described above.

Figures 7A, 7B:
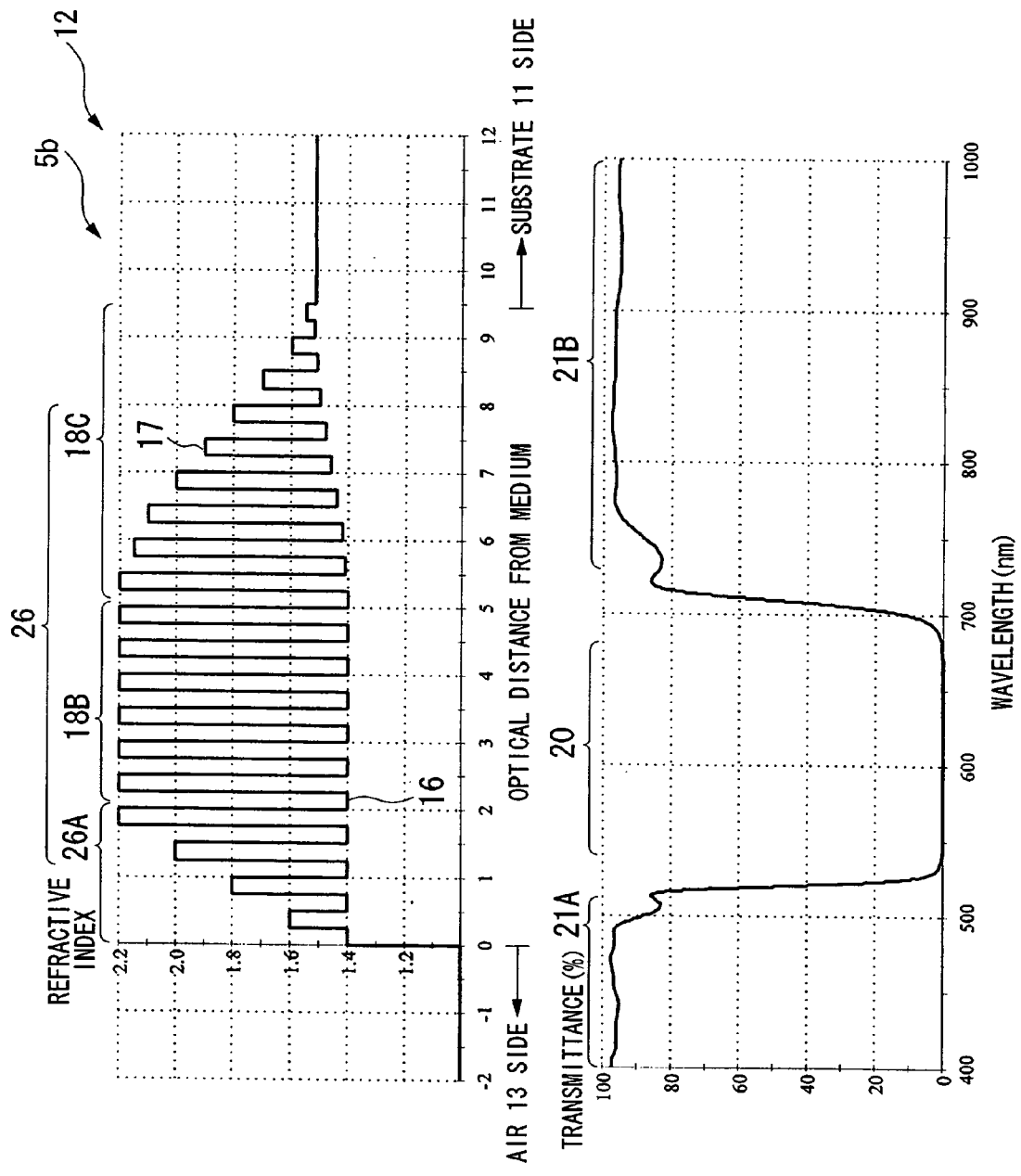
FIG. 7A is a graph of the film structure of a conventional absorption filter.
FIG. 7B is a graph showing the spectral characteristics of the same absorption filter.

Here, in order to compare the absorption filters 5 shown in FIG. 6A and FIG. 6B, the film structure of the absorption filter 5*b*, in which the outermost layer portion 15 is not provided, is shown in FIG. 7A, while the spectral characteristics of the absorption filter 5*b* are shown in FIG. 7B. In comparison to the absorption filter 5*b*, which does not have an outermost layer portion 15, the present embodiment can make the ripple of the fluorescent light in the transmission bands 21A and 21B small, and thereby it is possible to obtain the operation and effects identical to those described above.

Next, the second embodiment will be explained with reference to FIG. 8A and FIG. 8B. Note that in the following explanation, essential elements explained in the embodiment described above are denoted by identical reference numerals and their explanation has been omitted.

In the first embodiment, only one refractive index varying portion 18 is stacked on the substrate 11. In contrast, in the present embodiment, two refractive index varying portion 30 that form the thin film 28 of the absorption filter 27 are stacked. That is, the refractive index varying portion 30 is formed from a first refractive index varying portion 31 and a second refractive index varying portion 32.

Figures 8A, 8B:
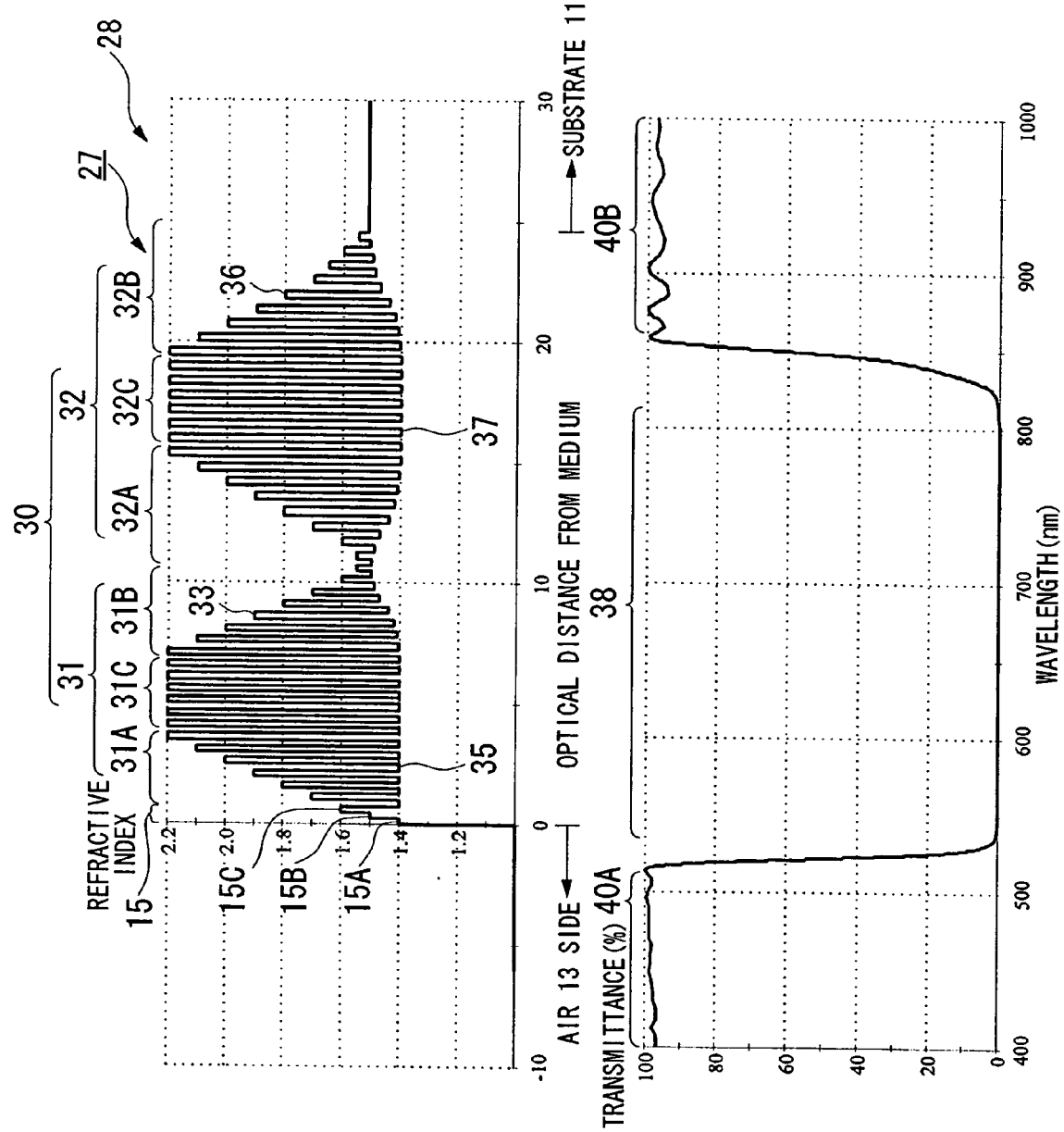
FIG. 8A is a graph showing the film structure of the absorption filter in the second embodiment of the present invention.
FIG. 8B is a graph showing the spectral characteristics of the same absorption filter.

As shown in FIG. 8A, the second refractive index varying portion 32 is stacked on the substrate 11, and the first refractive index varying portion 31 is stacked on the second refractive index varying portion 32. The outermost layer portion 15 is stacked on the first refractive index varying portion 31.

In the thin film 28, the thickness of each of the optical films of the outermost layer portion 15, the thickness of the optical films in the high refractive index layer 33 in the first refractive index varying portion 31, and the thickness of the optical films in the low refractive index layer 35 are different from the thickness of the optical films of the high refractive index layer 36 in the second refractive index varying portion 32 and the thickness of the optical films in the low refractive index layer 37.

In the present embodiment, the refractive index of the substrate 11 is 1.52, identical to that of the first embodiment. In addition, in the first refractive index varying portion 31, the refractive indices of the low refractive index layers 35 and the high refractive index layers 36 that form the first stacked portion 31A, the second stacked portion 31B, and the third stacked portion 31C is set so as to be identical to that of the refractive index varying portion 18 in the first embodiment. In the second refractive index varying portion 32, the refractive indices of the low refractive index layers 37 that form the first stacked portion 32A and the second stacked portion 32B is set stepwise within a range from 1.4 to less than 1.52. The refractive index of the low refractive index layers 37 that form the third stacked portion 32C is 1.4.

The refractive indices of the high refractive index layers 36 that form the first stacked portion 32A is set stepwise within a range exceeding 1.52 and up to 2.2. The refractive indices of the high refractive index layers 36 that form the second stacked portion 32B are also set within a range exceeding 1.52 and up to 2.2. The refractive index of the high refractive index layers 36 that forms the third stacked portion 32C is substantially identical to the highest refractive index among the high refractive index layers 36 that form the first stacked portion 32A.

The thin film 28 is formed by a film having 89 layers. That is, there are a total of 89 layers from the substrate 11 to the outermost low refractive index layer 15A of the outermost layer portion 15. In addition, the design wavelength of the thin film 28 is 600 nm. The thickness of each layer of the optical films that form the first refractive index varying portion 31 is 0.25 times the design wavelength, and the thickness of each layer of the optical films that form the second refractive index varying portion 32 is 0.3 times the design wavelength.

Here, the results of simulating the transmissivity are shown in FIG. 8B. Note that in the simulation, it is assumed that there is no refractive index dispersion in each layer.

As shown in FIG. 8B, the absorption filter 27 consists of a rejection band 38 which has a transmissivity of substantially 0% and transmission bands 40A and 40B which have an extremely high transmissivity. The wavelength positioned at the center of the rejection band 38 is substantially 680 nm, and the bandwidth of the rejection band 38 is about 280 nm. In contrast, the transmission bands 40A and 40B transmit the light that excludes the wavelengths included in the rejection band 30.

Figures 9A, 9B:
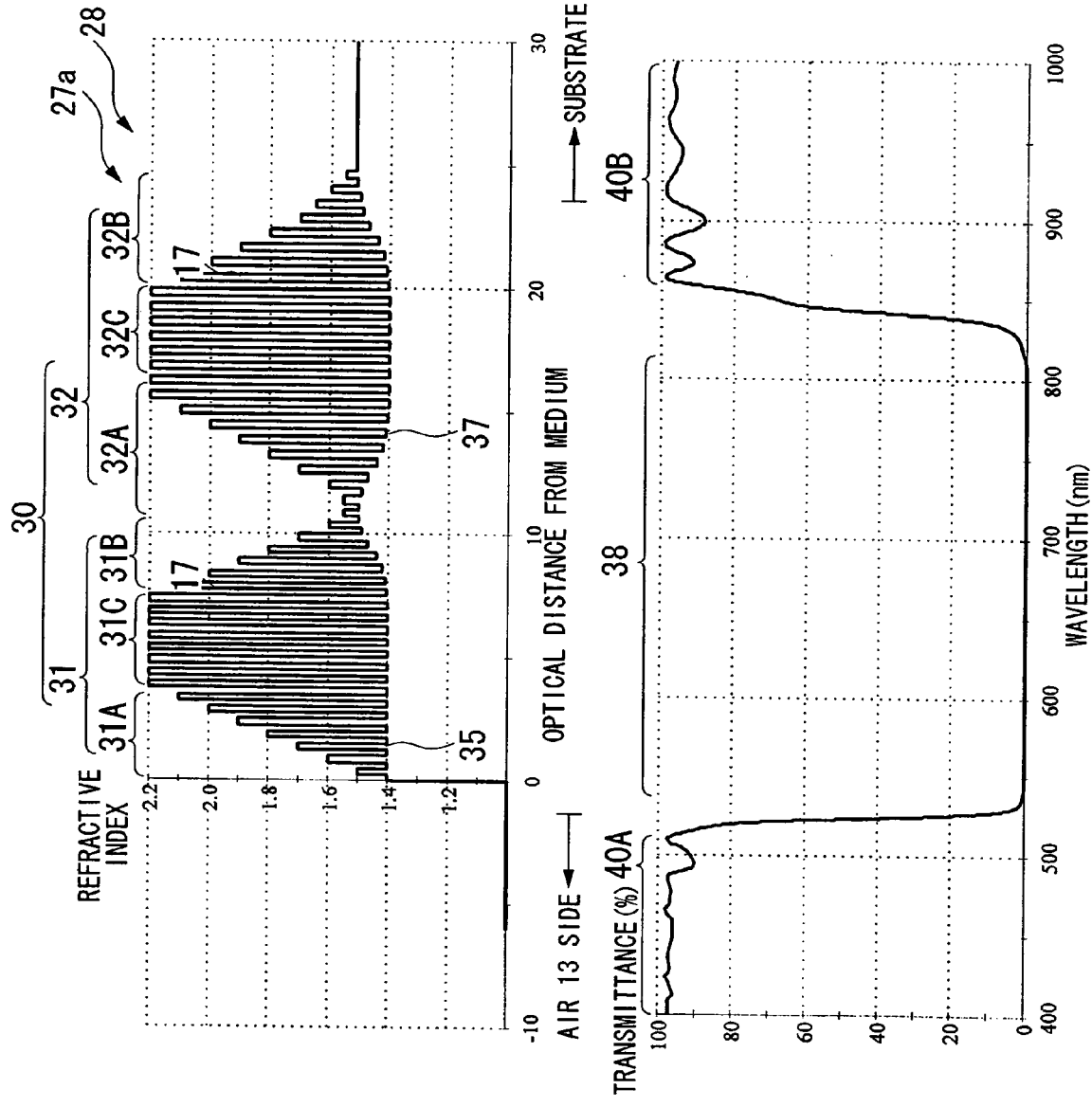
FIG. 9A is a graph showing the film structure of a conventional absorption filter.
FIG. 9B is a graph showing the spectral characteristics of the same absorption filter.

Here, in order to compare the absorption filters 27 of the present embodiment, the film structure of the absorption filter 27a, in which the outermost layer portion 15 is not provided, shown in FIG. 9A, while the spectral characteristics of the absorption filter 27a are shown in FIG. 9B.

According to the absorption filter 27 of the present embodiment, in comparison to the absorption filter 27a, in which the outermost layer portion 15 is not present, it is possible to make the ripple of the fluorescent light in the transmission bands 40A and 40B small. Thereby, similar to the first embodiment, it is possible to obtain a sufficient amount of light stably.

In the present embodiment, the thickness of each layer of the optical films that form the outermost layer portion 15, the first refractive index varying portion 31, and the second refractive index varying portion 32, can be changed. Thereby, the wavelength positioned at the center of the rejection band 38 can be shifted to an arbitrary position, and it is possible to set the width of the rejection band 38 to an arbitrary size.

Next, the third embodiment will be explained with reference to FIG. 10A and FIG. 10B. Note that essential elements that have been explained in the first embodiment have identical reference numerals, and their explanation has been omitted.

In the present embodiment, the refractive indices of each of the layers of the outermost layer portion 43 that forms the thin film 42 of the absorption filter 41 and the each of the layers that form the refractive index varying portion 45 differ from those of the first embodiment.

Figure 10A:
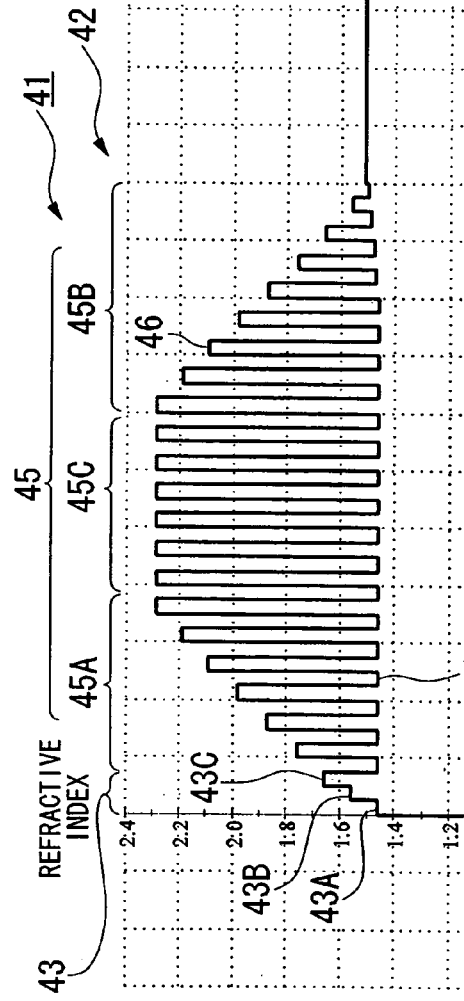
FIG. 10A is a graph showing the film structure of the absorption filter in the third embodiment of the present invention.

As shown in FIG. 10A, the refractive index of the outermost low refractive index layer 43A that forms the outermost layer portion 43 is 1.46; the refractive index of the first outermost high refractive index layer 43B is 1.56; and the refractive index of the second outermost high refractive index layer 43C is 1.66. The indices of refraction of the high refractive index layers 46 that forms the first stacked portion 45A is set stepwise within a range from 1.76 to 2.29. The refractive indices of the high refractive index layers 46 that form the second stacked portion 45B are set stepwise within a range exceeding 1.52 and up to 2.29. The refractive index of the low refractive index layers 47 that form the first stacked portion 45A and the third stacked portion 45C is 1.46. The refractive indices of the low refractive index layers 47 that form the second stacked portion 45B are set stepwise within a range from 1.46 to less than 1.52. The refractive index of the high refractive index layer 46 that forms the third stacked portion 45C is substantially identical to the highest refractive index among the high refractive index layers 46 that form the first stacked portion 45A.

The thin film 42 is formed by 44 layers. That is, there are a total of 44 layers from the substrate 11 side to the outermost low refractive index layer 43A of the outermost layer portion 43. In addition, the design wavelength of the thin film 42 is 600 nm, and the thickness of each layer of the optical films is 0.25 times the design wavelength.

Generally, a silicon oxide can be used for the material of the low refractive index layers 47, and generally a titanium oxide can be used for the material for the high refractive index layers 46.

Figure 10B:
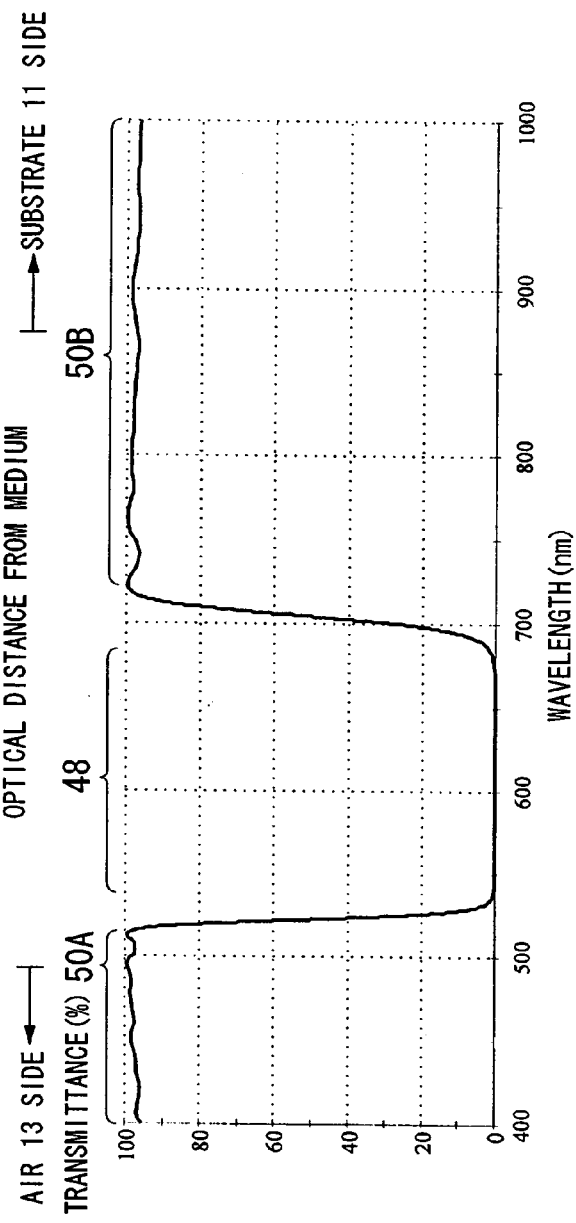
FIG. 10B is a graph showing the spectral characteristics of the same absorption filter.

Here, the results of simulating the transmissivity are shown in FIG. 10B. Note that in this simulation, it is assumed that each layer of the thin film 42 has no refractive index dispersion.

As shown in FIG. 10B, the absorption filter 41 consists of a rejection band 48, which has a transmissivity of substantially 0%, and the transmission bands 50A and 50B, which have an extremely high transmissivity. The wavelength positioned at the center of the rejection band 48 is substantially 610 nm, and the bandwidth of the rejection band 48 is about 140 nm. In contrast, the transmission bands 50A and 50B transmit the light that excludes the wavelengths included in the rejection band 48.

Figures 11A, 11B:
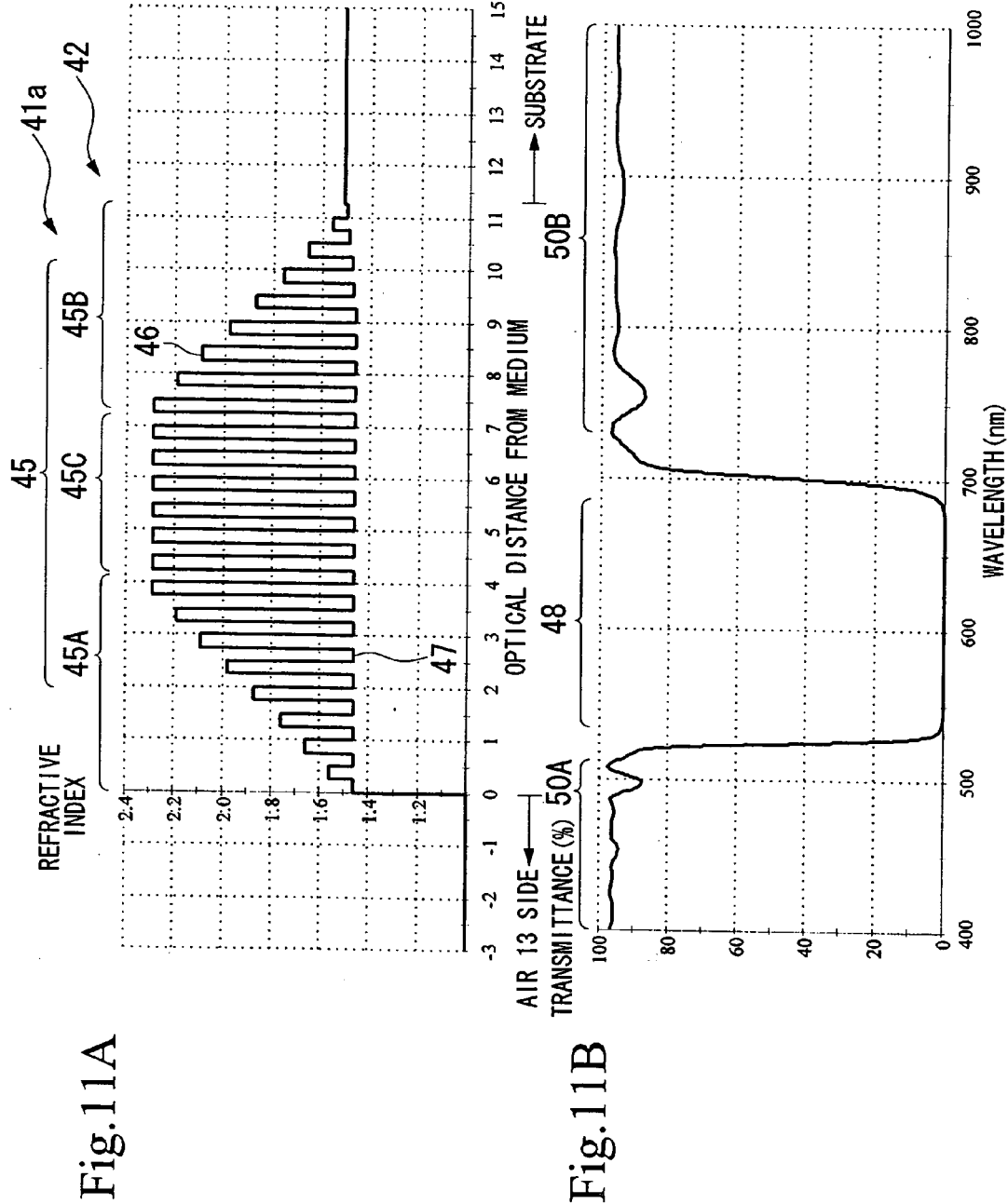
FIG. 11A is a graph showing the film structure of a conventional absorption filter.
FIG. 11B is a graph showing the spectral characteristics of the same absorption filter.

Here, in order to compare the absorption filter 41 of the present embodiment, the film structure of the absorption filter 41a, in which the outermost layer portion 43 is not provided, shown in FIG. 11A, while the spectral characteristics of the absorption filter 41a are shown in FIG. 11B.

According to the absorption filter 41 of the present embodiment, it is possible to obtain operations and effects that are identical to those of the first embodiment. In addition, in comparison to the absorption filter 41a, in which the outermost layer portion 15 is not present, it is possible to make the ripple of the fluorescent light in the transmission bands 50A and 50B small. Such operations and effects are identical, even when the refractive indices of each of layers differ from those in the first embodiment.

In addition, according to the present embodiment, the application to sputtering is easy in comparison to the film structure in the first embodiment. Thereby, it is possible to increase the degree of freedom of the film formation process.

Next, a fourth embodiment will be explained with reference to FIG. 12A and FIG. 12B. In the following explanation, essential elements that have been explained in any of the embodiment described above are denoted by identical reference numerals, and their explanation has been omitted.

Figure 12A:
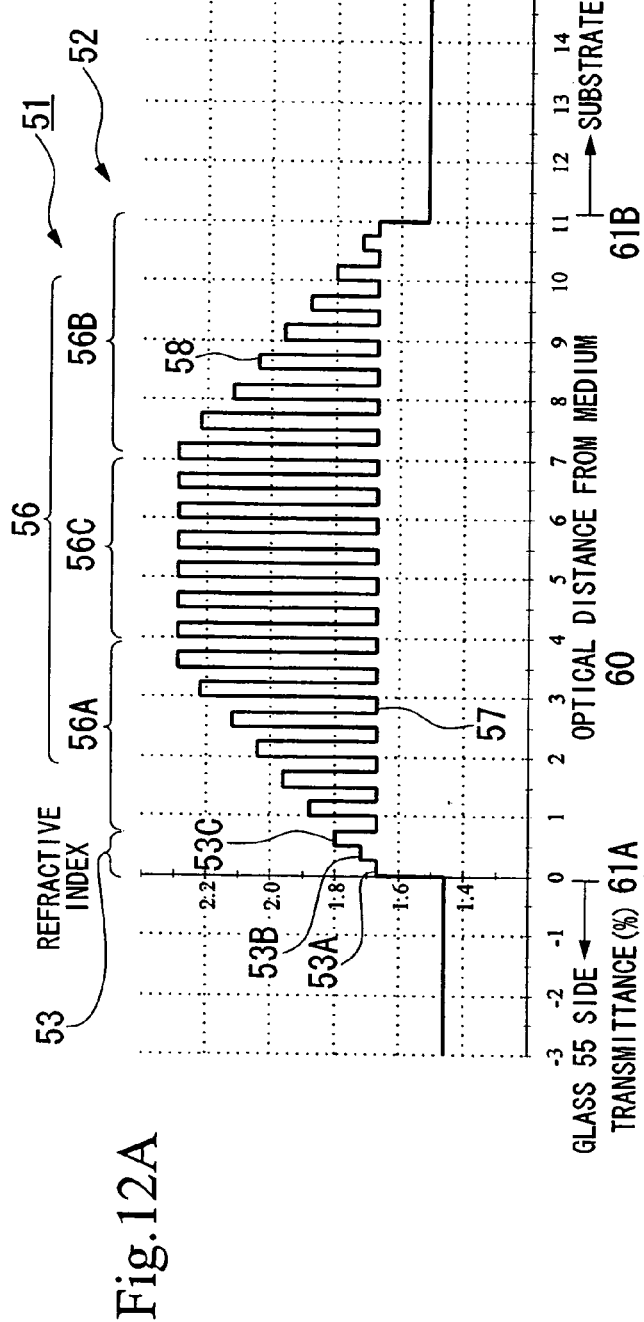
FIG. 12A is a graph showing the film structure of the absorption filter in the fourth embodiment of the present invention.

In the present embodiment, as shown in FIG. 12A, the outermost layer portion 53 that forms the thin film 52 of the absorption filter 51 is in contact with the glass (optical medium) 55, which has a refractive index of 1.46, and not the air 13. In order to clarify the difference with the refractive index of the glass 55, the refractive index of the low refractive index layers 57 that form the outermost low refractive index layer 53A, the first stacked portion 56A, the second stacked portion 56B, and the third stacked portion 56C is set to 1.67. The refractive indices of the high refractive index layers 58 that form the second stacked portion 56B are set stepwise within a range exceeding 1.67 and up to 2.29. The refractive index of the first outermost high refractive index layer 53B is 1.72, and the refractive index of the second outermost high refractive index layer 53C is 1.8. The refractive indices of the high refractive index layers 58 that form the first stacked portion 56A are set stepwise within a range exceeding 1.8 and up to 2.29. The refractive index of the high refractive index layers 58 that form the third stacked portion 56C is substantially identical to the highest refractive index among the high refractive index layers 58 that form the first stacked portion 56A.

The thin film 52 is formed by 44 layers. That is, there are a total of 44 layers from the substrate 11 side to the outermost low refractive index layer 53A of the outermost layer 53. In addition, the design wavelength of the thin film 52 is 600 nm, and the thickness of each layer of the optical film is 0.25 times the design wavelength.

Generally, alumina can be used for the material of the outermost low refractive index layer 53A and the low refractive index layers 57.

Figure 12B:
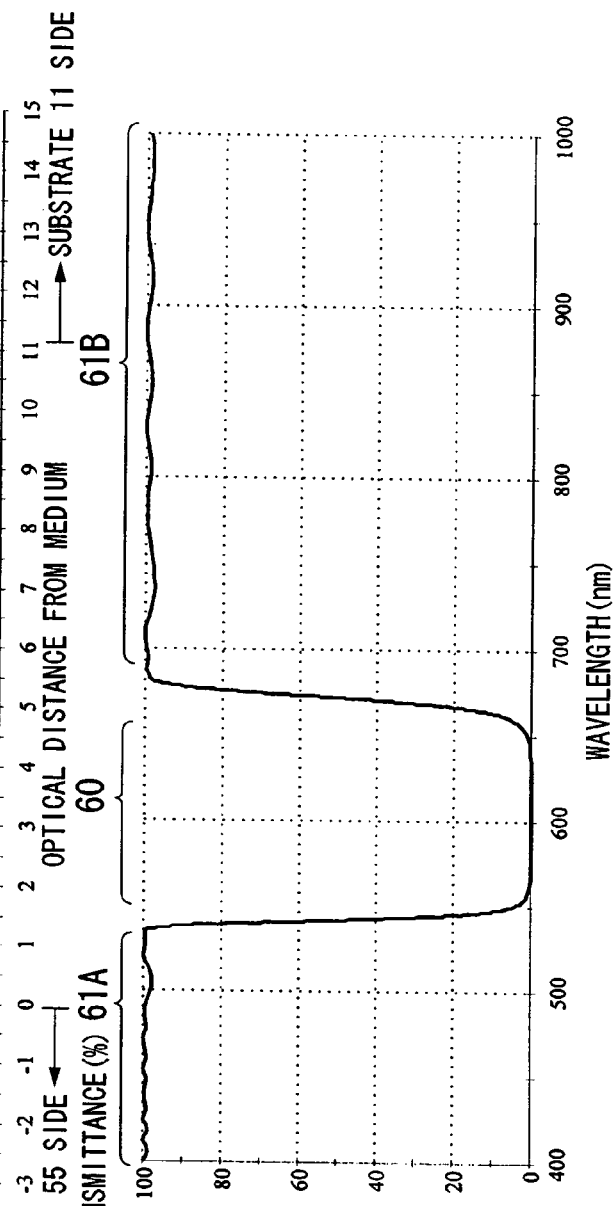
FIG. 12B is a graph showing the spectral characteristics of the same absorption filter.

Here, the results of simulating the transmissivity are shown in FIG. 12B. Note that in the simulation, it is assumed that each layer of the thin film 52 has no refractive index dispersion.

As shown in FIG. 12B, the absorption filter 51 consists of a rejection band 60, which has a transmissivity of substantially 0%, and transmission bands 61A and 61B, which have an extremely high transmissivity. The wavelength positioned at the center of the rejection band 60 is substantially 610 nm, and the bandwidth of the rejection band 60 is about 90 nm. In contrast, the transmission bands 61A and 61B transmit the light that excludes the wavelengths included in the rejection band 60.

Figure 13A:
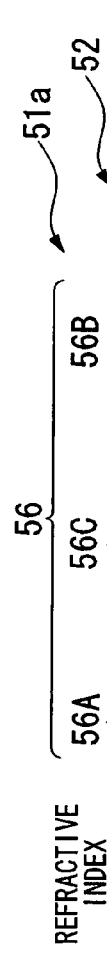
FIG. 13A is a graph showing the film structure of a conventional absorption filter.
Figure 13B:
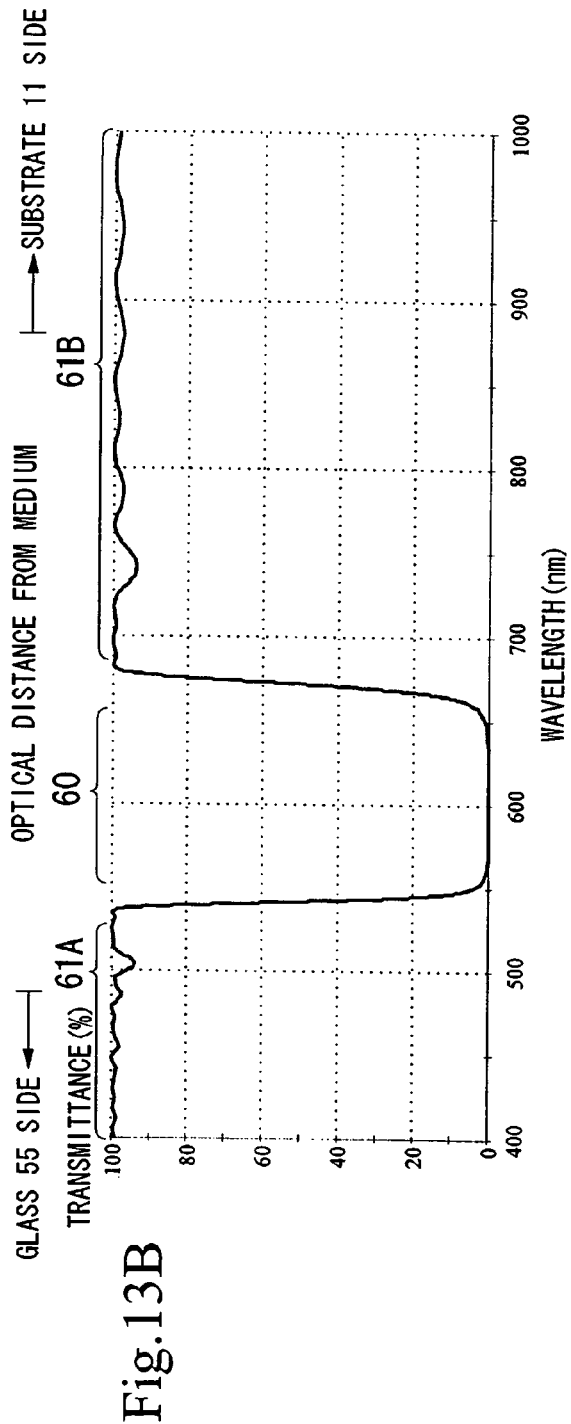
FIG. 13B is a graph showing the spectral characteristics of the same absorption filter.
Figure 14A:
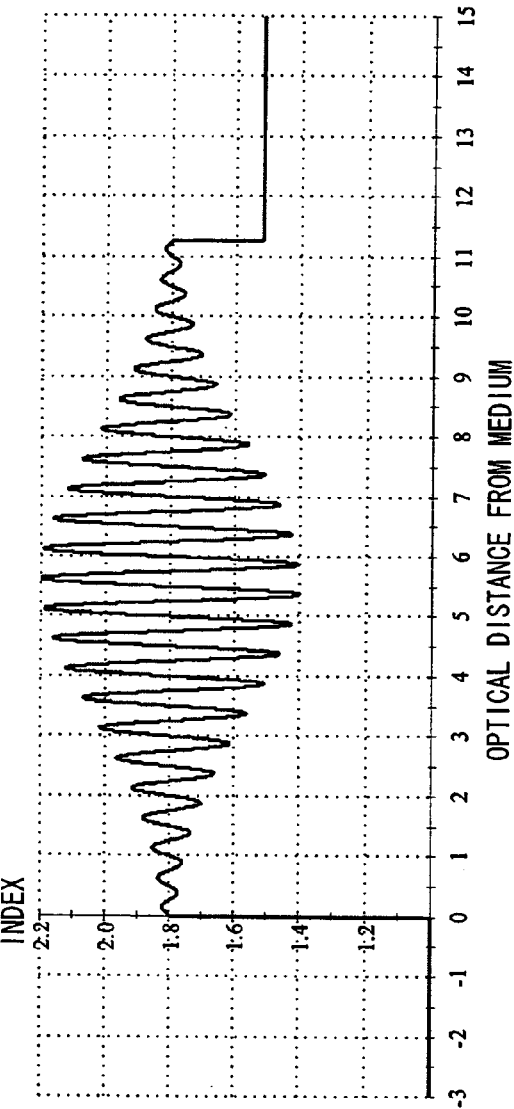
FIG. 14A is a graph showing the film structure of a conventional absorption filter.
Figure 14B:
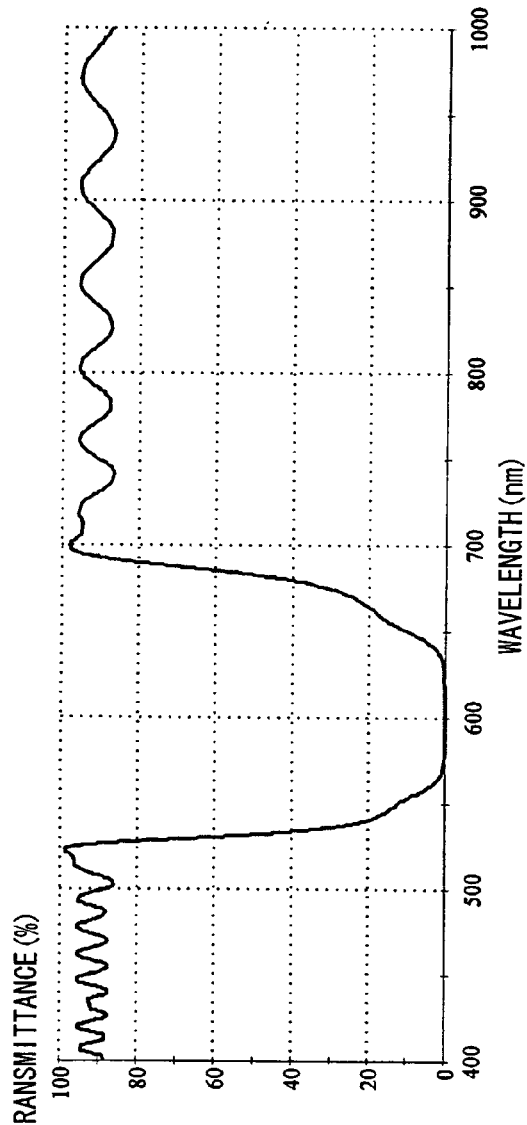
FIG. 14B is a graph showing the spectral characteristics of the same absorption filter.
Figure 15A:
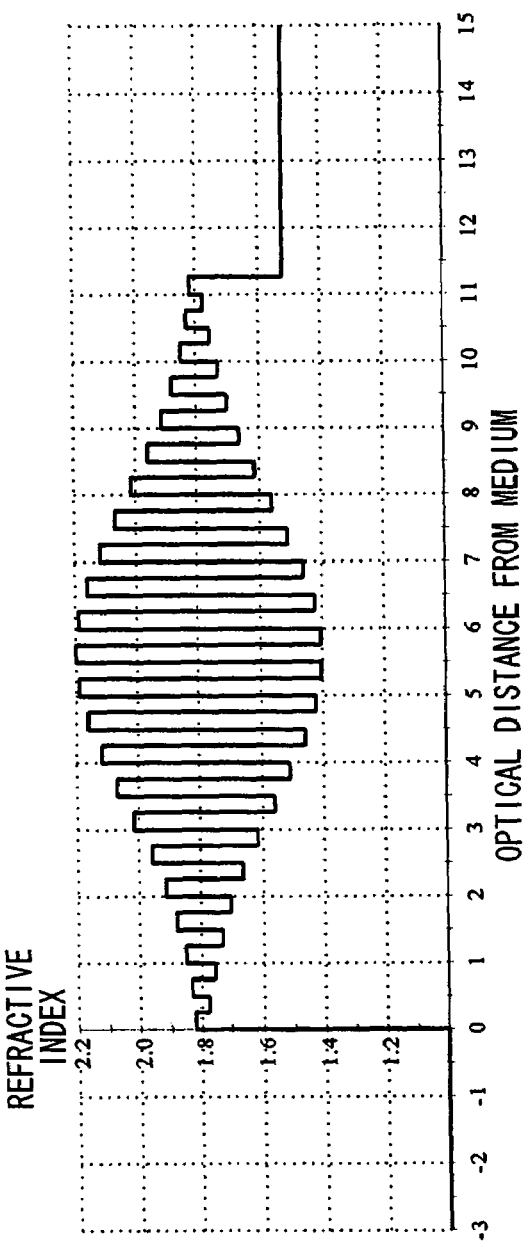
FIG. 15A is a graph showing the film structure of a conventional absorption filter.
Figure 15B:
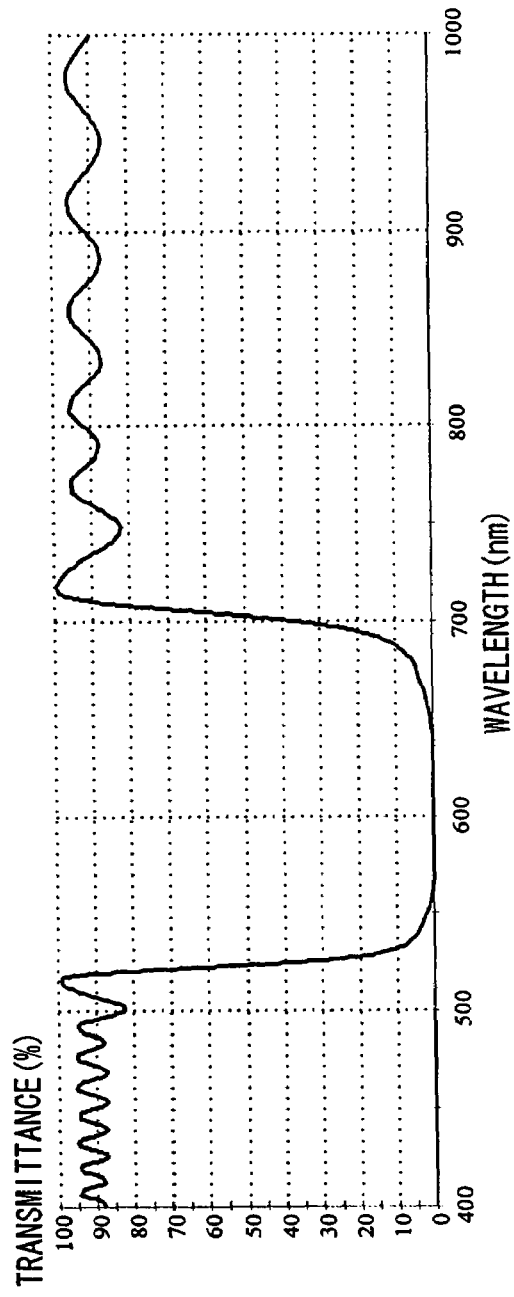
FIG. 15B is a graph showing the spectral characteristics of the same absorption filter.

Here, in order to compare the absorption filter 51 of the present embodiment, the film structure of the absorption filter 51a, in which the outermost layer portion 53 is not provided, shown in FIG. 13A, while the spectral characteristics of the absorption filter 51a are shown in FIG. 13B.

According to the absorption filter 51 of the present embodiment, it is possible to obtain the operations and effects that are identical to those of the third embodiment. In addition, in comparison to the absorption filter 51a, in which the outermost layer portion 15 is not present, the ripple of the fluorescent light in the transmission bands 61A and 61B can be made small. Such operations and effects can be obtained similarly even in the case (the present embodiment) that the outermost layer portion 53 is in contact with an optical medium besides air 13, such as glass 55.

Note that the technical scope of the present invention is not limited by any of the embodiments described above, and that it is possible to add various modifications that do not depart from the spirit of the present invention.

For example, the refractive indices of the high refractive index layers and the low refractive index layers in the embodiments described above is set so as to vary in a linear or a curvilinear manner, but the refractive indices may have any values.

Note that the effects of the optical filter of the present embodiments are as follows:

When light passes through, this optical filter has optical characteristics in which light corresponding to the rejection band of a nearly predetermined wavelength domain is rejected, and at the same time, light of the transmission bands corresponding to wavelengths outside the rejection band are transmitted. In addition, due to these optical characteristics, it is possible to increase the amount of transmitted light by making the border between the transmission bands and the rejection band steep, and it is possible to suppress the ripple in the transmission bands.

In addition, due to varying the thickness of the films, this optical filter can shift the position of the central wavelength of the rejection band to an arbitrary position, and it is possible to set the width of the rejection band to any arbitrary size.

In addition, this optical filter can suppress loss at the border between the substrate and the thin film, and it is possible to make the transmitted amount of light in the transmission bands more advantageous.

In addition, in an optical device that provides this optical filter, even in the case that the transmitted wavelength and the rejected wavelength are close, the amount of light of the wavelength in the transmission bands can be transmitted at a good efficiency without loss. That is, it is possible to cut the unnecessary light during observation and select light having the desired wavelength at high efficiency. Thus, in an optical device providing this optical filter, an optical capacity having superior spectral characteristics can be obtained. In addition, an optical device in which the detection sensitivity of light such as fluorescent light is further improved can be obtained.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical filter comprising a substrate and thin films formed on the substrate, wherein:

the thin films comprise an outermost layer portion and a refractive index varying portion;

the outermost layer portion contacts an optical medium whose refractive index is lower than the refractive index of the substrate, and comprises an outermost low refractive index layer, a first outermost high refractive index layer, and a second outermost high refractive index layer;

the outermost low refractive index layer is provided at a position in contact with the optical medium and has a refractive index that is higher than the refractive index of the optical medium;

the first outermost high refractive index layer is provided at a position in contact with the outermost low refractive index layer and has a refractive index that is higher than the refractive index of the outermost low refractive index layer;

the second outermost high refractive index layer is provided at a position in contact with the first outermost high refractive index layer and has a refractive index that is higher than the refractive index of the first outermost high refractive index layer;

the refractive index varying portion comprises low refractive index layers whose refractive index are higher than the refractive index of the optical medium, and high refractive index layers whose refractive index are higher than the refractive index of the low refractive index layer, the low refractive index layer and the high refractive index layer are alternately stacked towards the substrate side;

the refractive index varying portion is divided into a first stacked portion, a second stacked portion, and a third stacked portion;

the low refractive index layer which forms the first stacked portion is provided at a position in contact with the outermost layer portion, the refractive index of the high refractive index layer which is adjacent to the outermost layer portion by interposing between the outermost layer portion and itself among the high refractive index layers which form the first stacked portion is higher than the refractive index of the second outermost high refractive index layer, the refractive indices of other the high refractive index layers which form the first stacked portion, is as high as the high refractive index layer near the substrate;

the second stacked portion is provided at a position in contact with the substrate side of the first stacked portion, and the refractive indices of the high refractive index layers which form the second stacked portion, is as low as the high refractive index layer near the substrate; and the third stacked portion is provided between the first stacked portion and the second stacked portion, and the refractive index of the high refractive index layer is substantially identical to that of the high refractive index layer which has the highest refractive index among the high refractive index layers which form the first stacked portion.

2. The optical filter according to claim 1, wherein:

the refractive index varying portion is provided in plurality, and the refractive index varying portions are stacked towards the substrate side; and when one of the refractive index varying portions serves as a first refractive index varying portion and another one of the refractive index varying portions serves as a second refractive index varying portion, among the following refractive index layers, the film thickness of at least one of the refractive index layers differs from the film thickness of the other refractive index layers:

the high refractive index layer in the first refractive index varying portion;

the low refractive index layer in the first refractive index varying portion;

the high refractive index layer in the second refractive index varying portion;

the low refractive index layer in the second refractive index varying portion.

3. The optical filter according to claim 2, wherein:

the refractive index of the low refractive index layer in the first stacked portion and the third stacked portion is substantially identical to the refractive index of the outermost low refractive index layer; and the refractive index of the low refractive index layer in the second stacked portion is as high as the low refractive index layer near the substrate.

4. An optical device comprising the optical filter according to claim 3.

5. An optical device comprising the optical filter according to claim 2.

6. The optical filter according to claim 1, wherein:

the refractive index of the low refractive index layer in the first stacked portion and the third stacked portion is substantially identical to the refractive index of the outermost low refractive index layer; and the refractive index of the low refractive index layer in the second stacked portion is as high as the low refractive index layer near the substrate.

7. An optical device comprising the optical filter according to claim 6.

8. An optical device comprising the optical filter according to claim 1.

* * * * *